US012806946B2

(12) United States Patent
Yun et al.

(10) Patent No.: US 12,806,946 B2
(45) Date of Patent: Nov. 24, 2026

(54) MODULAR MULTI-AXIS LOAD-OFFLOADING HITCH SYSTEM

(71) Applicant: Tow Era Innovations Inc., Denton, TX (US)

(72) Inventors: Grace Chong Yun, Denton, TX (US); Un Joo (Andrew) Yun, Irvine, CA (US); Chi Won Yun, Denton, TX (US)

(73) Assignee: TOW ERA INNOVATIONS INC., Denton, TX (US)

( * ) Notice: Subject to any disclaimer, the term of this patent is extended or adjusted under 35 U.S.C. 154(b) by 0 days.

(21) Appl. No.: 19/400,720

(22) Filed: Nov. 25, 2025

(65) Prior Publication Data

US 2026/0192617 A1 Jul. 9, 2026

Related U.S. Application Data

(63) Continuation of application No. 19/051,204, filed on Feb. 12, 2025, now abandoned.

(Continued)

(51) Int. Cl.
*B60D 1/24* (2006.01)
*B60D 1/14* (2006.01)
(Continued)

(52) U.S. Cl.
CPC ............. *B60D 1/247* (2013.01); *B60D 1/143* (2013.01); *B60D 1/30* (2013.01); *B60D 1/44* (2013.01);
(Continued)

(58) Field of Classification Search
CPC ........ B60G 17/08; B60D 1/247; B60D 1/143; B60D 1/30; B60D 1/44; B60D 1/46; B60D 1/665
See application file for complete search history.

(56) References Cited

U.S. PATENT DOCUMENTS 2,463,746 A * 3/1949 Conley .................... B60D 1/66 280/405.1
2,719,733 A * 10/1955 Riemann .................. B60D 1/46 280/482

(Continued)

FOREIGN PATENT DOCUMENTS

AU 603171 B2 11/1990
CA 2322148 A1 4/2001

(Continued)

OTHER PUBLICATIONS

Merriam Webster Dictionary, definition of Integral (Year: 2026).*

(Continued)

*Primary Examiner* — Jacob D Knutson
*Assistant Examiner* — Abigail R Hymel
(74) *Attorney, Agent, or Firm* — Sterne, Kessler, Goldstein & Fox P.L.L.C.

(57) ABSTRACT

This disclosure addresses the longstanding issue of excessive tongue weight on tow vehicles by introducing a Modular Multi-Axis Load-Offloading Universal Hitch System. A dedicated caster wheel assembly beneath the towed vehicle's front substantially relieves rear-suspension stress on the tow vehicle and enables far-back axle placement for enhanced stability. Engineered for real-world road dynamics, the multi-axis motion hitch uses adjustable friction or alternative damping mechanisms to deliver precise control under varied conditions. A load-bearing mount adapts to multiple chassis designs, from retrofits of conventional A-frames to new towed vehicle geometries. Overall, this system improves fuel efficiency, towing stability, and general handling, while offering a flexible platform for current industry needs and future-oriented innovations.

19 Claims, 7 Drawing Sheets

Related U.S. Application Data

(60) Provisional application No. 63/743,193, filed on Jan. 8, 2025.

(51) Int. Cl.

| | |
|---|---|
| ***B60D 1/30*** | (2006.01) |
| ***B60D 1/44*** | (2006.01) |
| ***B60D 1/46*** | (2006.01) |
| ***B60D 1/66*** | (2006.01) |
| ***B60G 17/08*** | (2006.01) |

(52) U.S. Cl.
CPC ............... *B60D 1/46* (2013.01); *B60D 1/665* (2013.01); *B60G 17/08* (2013.01)

(56) References Cited

U.S. PATENT DOCUMENTS

| | | | | |
|---|---|---|---|---|
| 2,966,369 | A * | 12/1960 | Paul, Jr. | B60D 1/46 280/489 |
| 4,564,209 | A * | 1/1986 | Kingsley | B60D 1/465 180/199 |
| 4,610,457 | A * | 9/1986 | Harmon | B62K 27/12 280/492 |
| 5,934,698 | A * | 8/1999 | Despain | B60D 1/46 280/490.1 |
| 11,511,577 | B1 * | 11/2022 | Angel | B60D 1/345 |
| 2004/0155430 | A1 * | 8/2004 | Zahn | B60D 1/583 280/490.1 |
| 2005/0206127 | A1 * | 9/2005 | Christensen | B60D 1/665 280/511 |
| 2006/0288526 | A1 | 12/2006 | Larson | |
| 2008/0164678 | A1 * | 7/2008 | White | B60D 1/143 280/504 |
| 2010/0013189 | A1 * | 1/2010 | Pollock | B60D 1/02 280/515 |
| 2012/0119467 | A1 | 5/2012 | Svihla | |
| 2015/0165850 | A1 | 6/2015 | Chiu et al. | |
| 2015/0197125 | A1 * | 7/2015 | Kemper | B60D 1/06 280/446.1 |
| 2018/0170131 | A1 | 6/2018 | Schwarz et al. | |
| 2022/0041024 | A1 * | 2/2022 | Whipple | B60D 1/322 |
| 2022/0111681 | A1 * | 4/2022 | Sakamoto | B60C 11/01 |
| 2022/0135151 | A1 * | 5/2022 | Zhou | B62D 49/02 414/495 |
| 2023/0001993 | A1 | 1/2023 | Scruggs et al. | |
| 2023/0278379 | A1 * | 9/2023 | Draper | B60D 1/167 280/405.1 |

FOREIGN PATENT DOCUMENTS

| | | | |
|---|---|---|---|
| KR | 200470711 | Y1 | 1/2014 |
| WO | 9108940 | A1 | 6/1991 |
| WO | 0123196 | A1 | 4/2001 |
| WO | 0170522 | A1 | 9/2001 |

OTHER PUBLICATIONS

Aleksander Hac, Daniel Fulk, Hsien Chen, "Stability and Control Considerations of Vehicle-Trailer Combination," SAE Technical Paper 2008-01-1228, presented at the SAE World Congress, Apr. 2008, n.p., SAE International, Warrendale, PA, USA.

Dutts, A., Wu, X., and Farhad, M, "Improving Vehicle-Trailer System Dynamic Stability through Damper Tuning," SAE Technical Paper 2011-01-0978, published Apr. 2011, n.p., SAE International, Warrendale, PA, USA.

Smitha Vempaty and Yuping He, "A Review of Car-Trailer Lateral Stability Control Approaches," SAE Technical Paper 2017-01-1580, published Mar. 2017, n.p., SAE International, Warrendale, PA, USA.

International Search Report and Written Opinion for International Application No. PCT/US2026/010392, mailed on Apr. 24, 2026, 11 pages.

* cited by examiner

Component #3

MODULAR MULTI-AXIS LOAD-OFFLOADING HITCH SYSTEM

CROSS-REFERENCE TO RELATED APPLICATIONS

This application is a continuation of U.S. application Ser. No. 19/051,204, filed Feb. 12, 2025, titled "Modular Multi-Axis Load-Offloading Universal Hitch System," which claims the benefit of U.S. Provisional Application No. 63/743,193, filed on Jan. 8, 2025, titled "Modular Multi-Axis Load-Offloading Universal Hitch System." The disclosures of each of these applications are expressly incorporated herein by reference in their entireties.

TECHNICAL FIELD

The present disclosure relates generally to towed vehicle (e.g., trailer) towing assemblies and systems and, more specifically, to methods and apparatuses for repositioning the towed vehicle's front load so that the towed vehicle itself bears substantially the entire or the entire front-end load. By coupling this load-offloading principle with a multi-axis hitch capable of vertical/longitudinal articulation and optionally lateral control, the disclosed systems significantly reduce stress on the tow vehicle, enable far-back axle placements, and lay the foundation for new towed vehicle geometries beyond standards like the conventional A-frame.

BRIEF SUMMARY

Despite prior varied attempts, no single system offers a damped multi-axis platform that (1) transfers substantially the entire or the entire front load onto the towed vehicle itself, (2) accommodates variable articulations (vertical/longitudinal pitch, optional yaw), and (3) integrates friction or shock-based damping, for example, for stable highway speeds.

Accordingly, there remains a need for a comprehensive system that:

1. Offloads the front-end load onto a dedicated front caster or wheel assembly integrated into the towed vehicle body;
2. Provides multi-axis articulation (pitch, optional yaw, and damping adjustments) without compromising safety or maneuverability; and
3. Adapts to both traditional A-frame designs and innovative future towed vehicle chassis in a scalable, modular fashion.

This disclosure addresses earlier shortcomings by uniting offloading functionality with robust, adjustable multi-axis motion control—thereby introducing a new paradigm in towed vehicle technology.

The present disclosure provides a Modular Multi-Axis Load-Offloading Hitch System that transforms traditional towed vehicle towing configurations. A dedicated wheel assembly (e.g., a swivel/caster) beneath the front portion of the towed vehicle offloads substantially the entire or the entire frontal, or "tongue" weight from the tow vehicle's rear suspension, thereby significantly reducing stress on the tow vehicle and improving fuel efficiency.

Included in this system is a Multi-Axis Motion Hitch, designed to accommodate vertical/longitudinal articulation and, where desired, partial lateral pivot. In an embodiment, up-down/front-back movement is emphasized, leveraging far-rear axle placement for primary sway reduction. However, the system may incorporate a dedicated lateral or yaw axis to actively manage side-to-side forces. In all embodiments, the Motion Hitch offers user-adjustable damping—via friction plates, pivot bushings, shock absorbers, or equivalent mechanisms—to buffer pitching and, optionally, yaw impacts under diverse road conditions.

In an embodiment, to adapt to a wide range of towed vehicle frames, the disclosure may employ a Universal Suspension Bracket—sometimes referred to as a "universal A-frame" bracket. Nevertheless, the disclosure also contemplates designs where the caster or load-bearing wheel is integrated or welded directly into the towed vehicle's forward chassis, eliminating reliance on a separate bracket. This flexibility as an overarching "Load-Bearing Mount" supports both retrofitting of existing towed vehicles and the development of new towed vehicle geometries that bypass conventional tongue-weight dependencies.

By reassigning the towed vehicle's front load to a caster and enabling multi-axis (vertical, longitudinal, and optionally partial lateral) coupling at the hitch, the disclosure empowers manufacturers and consumers alike to reduce towing sway, enhance highway stability, and improve fuel economy.

Figure 1A:
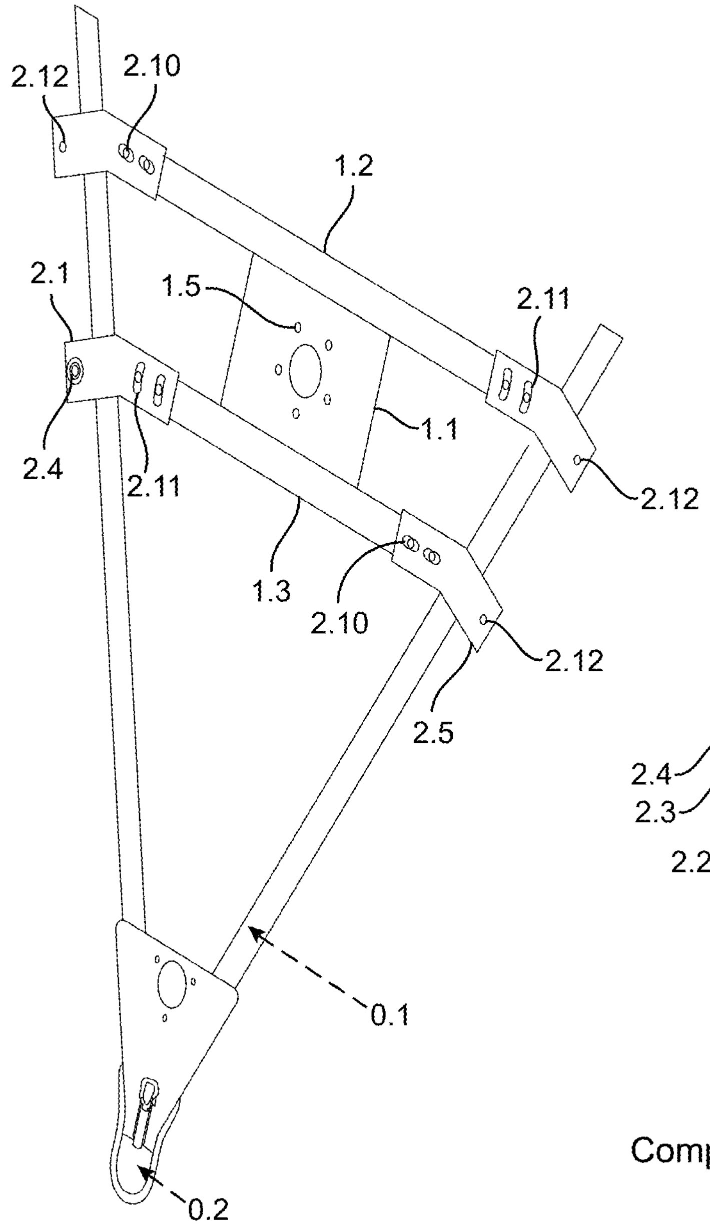
FIG. 1A is a top view illustrating the Universal Suspension Bracket (Component #1) attached to a towed vehicle frame (e.g., an A-frame) (0.1). Bracket elements such as the mounting plate (1.1), bracket tubes or bars (1.2, 1.3), and the lug nut holes (1.5) are shown, demonstrating how the bracket accommodates typical manufacturing variances in the towed vehicle's front chassis geometry.

The drawings are exemplary only and not limiting. Dimensions, part numbers, or configurations may be modified or scaled to fulfill specific application demands, consistent with the inventive principles disclosed. Figures are not necessarily to scale and may omit non-essential structures for clarity.

DETAILED DESCRIPTION

Overview

Load-Bearing Mount/Universal Suspension Bracket (Component #1)
- Adaptable to a wide range of towed vehicle frames, including A-frames.
- In some embodiments, partially or fully integrated into the front chassis, removing the need for adherence to the conventional "tongue" via discrete bracket.

Caster/Swivel Wheel Assembly (Component #2)
- Mounts under the towed vehicle's front, bearing the load traditionally carried by the tow vehicle's hitch while leveling appropriately with the height of the rear axle.
- Facilitates maneuverability and substantially reduces sway when combined with rearward axle placement.

Motion Hitch (Component #3)
- Provides multi-axis articulation, primarily vertical/longitudinal pitch, with an optional pivot or yaw axis for side-to-side control.
- User-adjustable damping (friction pads, pivot bushings, shock absorbers, etc.) can buffer pitching and, where implemented, lateral motion.

Assembly & Operation (Retrofit-Embodiment Example)

Example Universal Suspension Bracket (Component #1) Installation

Bracket Preparation:
- Confirm the towed vehicle's (e.g., trailer's) front chassis geometry (e.g., A-frame angle).
- Adjust or align bracket tubes/bars (e.g. 1.2 and 1.3) to match the trailer's A-frame; in an embodiment, oval holes in the bracket help accommodate small manufacturing variances.

Mounting to the Trailer:
- Position the bracket so that its mounting plates (2.1, 2.5) and hole arrays (1.4) align with the trailer's A-frame.
- Secure with heavy-duty fasteners (e.g., ½" Grade 5 or Grade 8 bolts). Nyloc or similar locking nuts are recommended to withstand vibration.
- Verify that the bracket is rigidly affixed; this bracket forms the foundation for attaching the caster assembly below.

Example Caster/Swivel Wheel Assembly (Component #2) Mounting

Attaching Component #2 to the Bracket:
- Once the bracket is installed, Component #2 is bolted or otherwise fastened beneath the mounting plate (e.g. via lug nut holes 1.5 or equivalent hardware).
- Ensure the caster's load rating is sufficient—recommended at least 20% above the towed vehicle's front-end load.
- Ensure the caster's wheel size, resilient suspension member length, or other support elements are compatible with the towed vehicle's rear axle height so that the towed vehicle's forward portion differs from the rear axle height, for example, by no more than approximately one inch. In an embodiment, this condition results in a state where a first ground clearance measured at a forward portion of the towed vehicle's frame and a second ground clearance measured at a rearward portion of the frame are considered to be equal for the purposes of maintaining a leveled towing stance.
- Confirm alignment of the wheel(s) relative to the bracket for smooth swivel action.
- The load-offloading function is achieved by bearing the towed vehicle's front weight on the caster, drastically reducing the load on the tow vehicle.

Example Motion Hitch (Component #3) Mounting

Attaching to the Tow Vehicle:
- Insert the adjustable extension (4.9) of the Motion Hitch into the tow vehicle's receiver (0.3). Standard hitch receivers (Classes I-V) are compatible, but the chosen hitch ball (4.1) size should match the towed vehicle's coupler (0.2). Adjust or tighten the main receiver pin as required.

Example Coupling & Decoupling Procedure

Once Components #1 and #2 are installed, the towed vehicle's coupler (0.2) will be statically positioned at a fixed height. The Motion Hitch (Component #3) must therefore be adjusted to align the hitch ball (4.1) with the coupler (0.2).

Example Height Alignment Guideline
- Measure the distance from the ground to the bottom of the towed vehicle's coupler (0.2). Assume it is approximately 20 inches for illustrative purposes.
- With the Motion Hitch inserted into the tow vehicle's receiver (0.3), the final result (after comprehensive adjustments) should have the bottom of the hitch ball (4.1) aligned so that it matches the height of the coupler (0.2).
- In many configurations, arms (4.5, 4.6) will be angled slightly upward (e.g., 5-10 degrees). This geometry ensures that (4.1) sits above the pivot hardware (e.g., 4.18).

Using the Height Adjustment System
- Loosen or remove the bolts connecting 4.7 with 4.8 and 4.9, then shift them as needed to raise or lower the Motion Hitch (and 4.1, by extension) to the target height.

Reinstall or tighten these bolts to lock in the vertical position. A moderate upward angle on arms (4.5, 4.6) is acceptable for typical towing scenarios.

Example Damping Control System Setup

Rotate a tensioning control (4.16) left (counterclockwise) to loosen friction between a bar (4.13) and a case (4.14). This makes it easier to move the hitch ball (4.1) up or down by hand.

Position (4.1) lower than coupler (0.2) before backing the tow vehicle into alignment.

Coupling

Maneuver the tow vehicle so that hitch ball (4.1) is directly beneath the coupler (0.2).

Loosen tensioning control (4.16) again, if necessary, to allow final vertical adjustment of hitch ball (4.1).

Manually lift hitch ball (4.1) into coupler (0.2) and engage the coupler's locking mechanism. Ensure the coupler is securely latched.

Locking the Damping Control System

Once hitch ball (4.1) and coupler (0.2) are mated, rotate tensioning control (4.16) to the right (clockwise) to reintroduce friction. This helps stabilize pitching and sway by applying moderate pressure between the bar and case (e.g., slide plates) (4.13, 4.14).

Verify that the friction setting is neither too loose (causing excessive towed vehicle movement) nor too tight (making pivoting overly stiff).

Decoupling

To detach coupling, reverse the steps: loosen tensioning control (4.16), unlatch the towed vehicle's coupler, and lower hitch ball (4.1) away from coupler (0.2). If needed, adjust height or friction to facilitate smooth removal.

Example Operational Benefits

Load Offloading

By transferring the towed vehicle's tongue weight onto Component #2, the tow vehicle's rear suspension endures less stress, improving fuel efficiency and steering control.

The integrated design specifically contemplates near-zero upward force from the tow vehicle's side.

Multi-Axis Towing Stability

The combination of pivot linkages, shocks, and friction components allows the towed vehicle to pitch and absorb road irregularities. This yields a more stable, controlled ride, especially at highway speeds.

Scalability & Modularity

Different towed vehicle sizes or frame geometries can be accommodated by altering bracket hole patterns, caster load/shock/wheel ratings/sizes, the hitch's friction/height adjustments, etc.

Repairs or upgrades are simplified because each component—Bracket (#1), Caster (#2), Hitch (#3)—can be retrofitted or replaced independently.

DETAILED DESCRIPTION OF THE EMBODIMENTS

Overview of Example Components

The embodiments described herein illustrate a realized system for load-offloading and multi-axis towing. In a variety of embodiments—for example, spanning light-duty consumer towed vehicles, heavy-duty or commercial rigs, marine/boat applications, RV/camper towing, and off-road scenarios—three components (whether bracket or chassis-based) can be included:

1. A caster assembly at the towed vehicle front,
2. A load-bearing mount (e.g., universal suspension bracket or integrated chassis mount) to secure the caster, and
3. A multi-axis motion hitch attaching to the tow vehicle.

These components may vary dimensionally or materially to accommodate different weight capacities or environmental conditions. Nevertheless, they achieve the same effect: the towed vehicle's frontal load is substantially offloaded onto a caster instead of the tow vehicle's rear axle, while a multi-axis hitch provides damped articulation for stability and maneuverability.

The examples, materials, and dimensional references provided herein illustrate current embodiments without limiting their broader scope or potential improvements. One skilled in the art may combine elements (e.g., bracket angles, integrated chassis mount, caster shock types, friction damping variants) in different ways while remaining within the spirit of the invention.

Example Generalized Embodiment (Consumer/Light-Duty Towed Vehicles (e.g., Trailers))

Example Suspension Bracket Installation

Bracket Tubes/Bars (e.g., 1.2 and 1.3) may be shaped to mate with a typical A-frame trailer chassis. In an embodiment, oval or slotted holes allow small positional adjustments for manufacturing variances.

Mounting Method: Heavy-duty bolts (e.g., ½ " Grade 5 or Grade 8) and locking nuts secure the bracket to the trailer's front chassis, forming a rigid foundation for the caster assembly (Component #2).

Material & Dimensions for components of the bracket (Component #1): Typically ¼-½" thick plates (aluminum, steel alloy), optionally with corrosion-resistant coatings.

Example Caster/Swivel Wheel Assembly (Component #2) Attachment

Caster Wheel: A single swivel caster or dual-wheel assembly rated ~20% above the peak frontal weight for consumer trailers.

Swivel & Shock: Allows 360° rotation for turning or reversing. An optional shock absorber (3.10) and/or pivot bushing (3.12) can reduce road vibrations or caster flutter.

Bracket Interface: Lug or bolt holes (e.g., 1.5) in the bracket's mounting plate (1.1) align with the caster hub (3.1). Bolted attachment ensures the trailer's front weight is carried at the caster pivot.

Example Motion Hitch (Component #3) Connection

Receiver Adaptation: The Motion Hitch's adjustable extension (4.9) fits the tow vehicle's standard hitch receiver (0.3) (Class I-V).

Multi-Axis Pivot: A user-adjustable Damping Control System (4.13, 4.14, 4.15, 4.16) and pivot bushings (4.10, 4.11) permit or restrict vertical/longitudinal articulation, with partial lateral sway reducing stress on the towed vehicle and tow vehicle.

Coupling Height: An integrated height adjustment (e.g., 4.7-4.9) aligns the hitch ball with the towed vehicle coupler, accounting for the caster-lifted tongue.

Example Operational Benefits

Load Offloading: The towed vehicle frontal load is predominantly carried by the caster, minimizing rear-axle stress on the tow vehicle.

Enhanced Stability: Freed from supporting the front load, the towed vehicle's main axle(s) can be placed further rearward, reducing sway.

Fuel Efficiency & Ride Comfort: Less strain on the tow vehicle often translates to better fuel economy and smoother towing.

This light-duty embodiment exemplifies a retrofitting approach for standard consumer trailers, utility haulers, and similar towing contexts where moderate load capacity is required.

Example Heavy-Duty Embodiment (Commercial or Industrial Towed Vehicles (e.g., Trailers))

Example Reinforced Bracket (Component #1) Construction

Bracket Material: High-tensile steel (e.g., A514). Plate thickness may exceed ½" and incorporate gussets or webs to handle heavier tongue weights.

Mounting Hardware: Larger diameter bolts (Grade 8 or higher) ensure structural integrity under high loads.

Example Upsized Caster/Swivel Wheel Assembly (Component #2)

High Load Rating: A single or dual-caster configuration rated well above the maximum anticipated tongue load, sometimes in the thousands of pounds.

Shock & Damping: Heavy-duty coil springs or industrial-grade shock absorbers manage road impacts common in commercial transport.

Example Motion Hitch (Component #3) for High Loads

Robust Pivot Hardware: Thicker arms, larger pivot pins, and wider friction surfaces accommodate high gross weights and rugged conditions.

Friction Control Enhancements: Additional friction plates or stiffer damping elements maintain stable articulation under extreme conditions.

Example Industrial Context & Advantages

Ideal for Construction, Heavy Equipment: The multi-axis design buffers uneven terrain shocks.

Significant Fuel Savings: With higher payloads traveling long distances, offloading tongue weight can yield notable efficiency gains.

Example Marine/Boat Trailer Embodiment

Example Bracket & Caster Anti-Corrosion Feature

Marine-Grade Alloys: Stainless steel or galvanized finishes to resist saltwater exposure.

Sealed Bearings & Fasteners: Wheel bearings are sealed against water ingress; all hardware features corrosion-resistant coatings.

Example Compatibility with Boat Hull Shapes

Frame Angles: Adjustable bracket angles or slotted holes accommodate tapered or non-standard frames typical of boat trailers.

Water-Resistant Hitch Components: Friction pads, pivot bushings, and tension bolts may use sealants or protective lubricants.

Example Use Case

Reduced Rear-Axle Load: During highway travel to/from marinas.

Wet/Slippery Maneuvers: The caster assembly eases maneuvering in tight launch ramps, mitigating hull or propeller damage.

Example RV/Camper Embodiment

Example Bracket (Component #1) Customizations

Optional Storage: Recessed compartments for towing accessories.

Heightened Damping: Additional friction pads or shock absorbers within the Damping Control System to reduce "bounce" and/or sway during extended highway travel.

Example Caster Assembly & Ride Quality

Spring-Rate Selection: Coilover shocks and/or pivot bushings, for example, of the Caster/Swivel Wheel Assembly (Component #2) and/or Motion Hitch (Component #3) balanced to the weight distribution of an RV or camper layout.

Example Motion Hitch (Component #3) Adjustability

Accommodating Various RV Frames: Multi-axis pivot adjustments ensure stable towing across variable road conditions.

Passenger Comfort: Less sway translates to a smoother ride, especially on long journeys.

Example Off-Road/Utility Embodiment

Example Bracket (Component #1) Reinforcements & Articulation

Off-Road Frames: Extra gussets or thicker plates distribute impact loads over rough terrain.

Caster Pivot Range: Slotted brackets allow wider caster rotation angles for deeper suspension deflection.

Caster Assembly (Component #2) With Enhanced Shock Absorption

High-Travel Coilovers: Accommodate large obstacles or uneven trails.

Heavy-Duty Pivot Bushings: Minimize lateral slack on extreme off-camber angles.

Motion Hitch (Component #3) for Rough Terrain

Loosened Damping: Operators can reduce friction for maximum articulation, preventing hitch binding.

Over-Articulation Limiters: Protect the caster from excessive downward travel over steep crests.

Off-road users benefit from preserving the tow vehicle's rear suspension travel, helping maintain traction and stability in challenging environments.

Example Integrated Chassis Mount for Caster Assembly

In some embodiments, the caster assembly is formed or welded directly into the towed vehicle's front chassis, replacing a discrete bracket. However, both bracket and integrated chassis mount versions yield the same cooperative effect. This integrated design supports various structural configurations while offloading the front load:

Reinforced Chassis Region:

A front portion of the towed vehicle frame (0.1) may include apertures, bushings, or sleeves for the caster spindle. Additional gussets or cross braces can distribute load.

Extended Frame Rails & Coupler Alignment:

Parallel or V-shaped rails can be extended or angled inward to create a central hub for the caster. The coupler (0.2) mount is part of the same chassis structure, ensuring stable coupler height relative to the tow vehicle.

Dynamic Load Considerations:

In integrated designs, stresses spread across multiple flanges, casted bodies or welded joints. The caster pivot may incorporate friction discs, shock absorbers, or elastomeric bushings to counteract vibration.

Rearward Axle Accommodation:

By carrying the front load on the caster, the towed vehicle's main axle(s) can shift further back, improving directional stability without relying on a bracket-based arrangement. The integrated design thus accommodates various towed vehicle geometries in which the front load is predominantly or entirely self-supported.

Example Damping Variations for Multi-axis Motion Hitch (component #3)

Figure 5A:
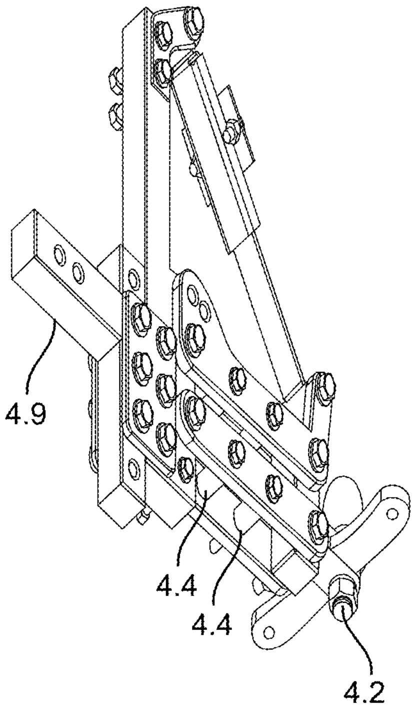
FIGS. 5A-5B are perspective views of the Motion Hitch (Component #3), which may connect the tow vehicle's receiver (0.3) to the towed vehicle's coupler (0.2) shown in FIG. 1A. The figures displays multi-axis pivot arms (4.5, 4.6), an adjustable height system (4.7, 4.8, 4.9), and a damping control subsystem (4.13, 4.14, 4.15, 4.16) that enables user-adjustability. Elements such as spacers (4.4) and pivot bushings (4.10, 4.11) further stabilize motion, while an over-articulation limiter (4.23) protects against excessive pitching below horizontal.
Figure 5B:
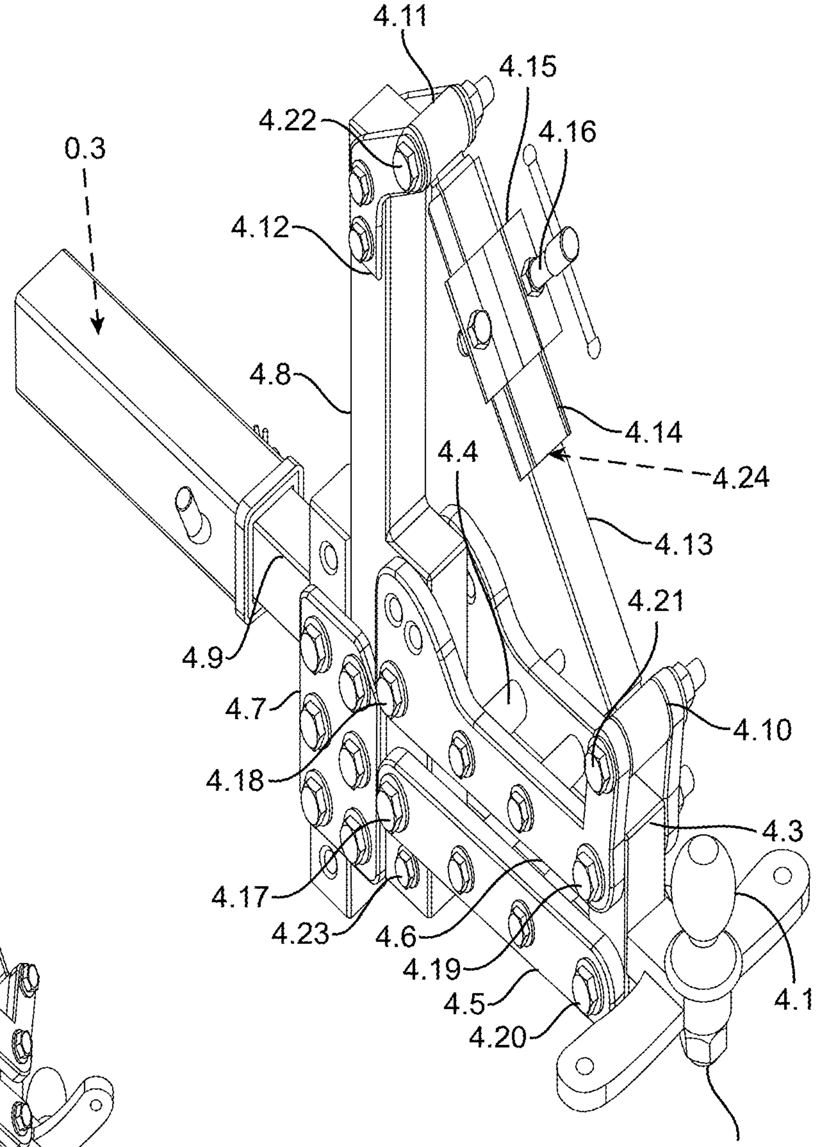

Including the friction-based damping mechanism discussed in conjunction with the embodiment shown in FIGS. 5A-5B, various alternative or supplemental damping configurations may be employed to regulate vertical, longitudinal, and/or lateral pivot motion at the hitch. These configurations are described below with reference to components shown in FIGS. 5A-5B, as applicable:

Example Friction Plate Assemblies

In one embodiment, user-adjustable friction plates provide the primary damping interface between pivot arms (e.g., pivot arms (4.5, 4.6)) or sleeves. A tensioning mechanism (e.g., tensioning control 4.16) can increase or decrease the normal force on one or more friction plates, thereby altering the pivot resistance. This arrangement may be located around the main vertical/longitudinal pivot axes or an additional yaw pivot. By selectively tightening/loosening the tension, operators can tune the frictional engagement for highway stability, off-road maneuverability, or easy coupling/decoupling.

Example Coilover, Strut or Oil-based Shock Absorbers Designs

Another embodiment incorporates a short shock absorber or damper pinned between the hitch body (e.g., a pivot bracket including adjustable extensions (4.8, 4.9)) and a pivot arm (e.g., one of pivot arms (4.5, 4.6)). As the hitch pivots vertically, longitudinal, or partially laterally, the shock absorber or damper absorbs and dissipates energy. This absorber may be fitted with an adjustable preload collar or a multi-position valve to fine-tune compression and rebound damping. For added durability, a mounting bracket can be welded or bolted to the hitch arms (e.g., pivot arms (4.5, 4.6), ensuring the shock remains in line with the pivot axis.

Example Wave Springs or Disc Spring Stacks

In some implementations, the damping force is generated by one or more wave springs or a stack of disc springs (Belleville washers) arranged to compress against the pivot arms (4.5, 4.6). A tensioning rod or cap can compress or release these springs, varying the pivot resistance. This configuration is well-suited to compact geometries, where space is limited but a moderately high damping force is needed. Wave springs also offer a more linear load-deflection profile, potentially aiding in predictable towing feedback.

Example Fluid-Based Dampers (Hydraulic or Pneumatic)

Yet another variant uses a small hydraulic or pneumatic cylinder placed along or adjacent to the hitch pivot axis. The cylinder is pivotally connected at both ends (e.g., to the hitch body (including adjustable extensions 4.8, 4.9) and the pivot arm (one of pivot arms (4.5, 4.6)) so that any pitching or yawing motion displaces fluid. Flow control valves or orifices within the cylinder regulate fluid movement, creating adjustable damping. In the case of a pneumatic strut, changing internal air pressure can raise or lower damping forces. Quick-release fittings or manual valves may be provided for field adjustments.

Example Magnetorheological (MR) or Electrorheological Fluid Dampers

In certain advanced embodiments, a chamber containing magnetorheological or electrorheological fluid can be integrated into the hitch's pivot assembly. By applying an electromagnetic field (via a small coil or external controller), the fluid's viscosity changes in real time, thereby dynamically adjusting the pivot damping. Such an arrangement allows for automatic or user-driven fine-tuning of tow dynamics and can be synchronized with sensor feedback (e.g., detecting sway angles or load shifts).

Location, Mounting, and User Controls: In all of the above variations, the damping subsystem is structurally coupled to the main pivot assemblies (e.g., arms (4.5, 4.6), pivot bushings (4.10, 4.11), or hitch brackets) in such a way that the damping force opposes relative rotation around at least one axis (vertical, longitudinal, lateral, or any combination). Fasteners (e.g., bolts, pins) or welds may be used to secure each damper. Depending on the application, a user-accessible adjustment knob, valve, or electronic controller can be added to configure damping levels in real time.

Variable Aggregate Ratings and Dimensional Adjustments for Caster Assembly(ies)

In certain embodiments, one or more caster assemblies (Component #2) may be configured with variable load ratings and adjustable length or size components (e.g., wheel diameters, resilient suspension member (3.10) characteristics) to ensure the towed vehicle's frame is maintained in a predetermined, level orientation. This level orientation is achieved when a first ground clearance measured from the ground to a forward portion of the towed vehicle's frame along a vertical direction is equal to a second ground clearance measured from the ground to a rearward portion of the towed vehicle's frame along a vertical direction. Where multiple caster assemblies are employed—such as two swiveling units positioned on either side of the towed vehicle's forward portion—their aggregate load capacity collectively may exceed the towed vehicle's anticipated front-end load by a recommended margin (e.g., at least twenty percent above the towed vehicle's "tongue weight" if previously borne by the tow vehicle).

To match the rear-axle stance and maintain a leveled towing geometry, the caster assembly's wheel size may vary, allowing smaller or larger wheels to compensate for height differences. Additionally, the characteristics of a resilient suspension member (3.10) (such as a shock absorber or spring) can be selected, fine-tuning the caster assembly's ride height. In some designs, the chassis (0.1) or bracket (Component #1) may include alternate mounting holes, slider rails, or telescoping segments to achieve precise vertical alignment. By coordinating the caster assembly's load rating (whether a single high-capacity unit or multiple assemblies sharing the burden) and dimensional adjustments (wheel diameter, resilient suspension member characteristics, or other vertical travel features), the forward portion of the towed vehicle remains substantially level with its rear axle, preserving stable load distribution and reducing the transmission of road-induced forces between the tow vehicle and the towed vehicle.

Summary of Example Embodiments

Accordingly, each of the embodiments disclosed herein can include: a dedicated caster bearing substantially the entire or the entire frontal load, paired with a multi-axis motion hitch providing controlled articulation. Whether employing a universal suspension bracket or an integrated chassis mount, this disclosure addresses excessive front-end load ("tongue" weight), sway, and rear-axle strain on the tow vehicle.

Optional Additional Features

In any of the embodiments disclosed herein, certain optional enhancements—including sensor integrations, software functionalities, or specialized mechanical/electrical subsystems—may be incorporated to further leverage this disclosure's underlying architecture. While not strictly required for the base configurations disclosed herein, these possibilities support future refinements or specialized applications.

Sensor-Based Load Monitoring

A hitch system incorporating a multi-axis force sensor array integrated into the universal bracket and/or caster pivot that continuously measures dynamic forces—including lateral and longitudinal loads—in addition to static vertical tongue weight. The sensor array outputs real-time data via a wireless transceiver to a control module on the tow vehicle or to a cloud-based service. In one embodiment, optical or camera-based non-contact sensing is used in conjunction with conventional load cells to enhance resolution and accuracy, thereby enabling real-time monitoring for dynamic stability control and overload warning.

Telematics & Software Control

A "smart hitch control module" embedded within the hitch assembly that continuously monitors hitch parameters (such as tongue weight, damping status, and alignment) and actively adjusts mechanical parameters—including hitch height, damping force, or caster orientation—in real time via wireless commands. The module connects to a smartphone app or cloud service, enabling remote diagnostics, firmware updates, and user-configurable settings. In one embodiment, the system automatically switches between operating modes (e.g., from a "damping mode" to a "rigid coupling mode") based on real-time telematics data and vehicle operating conditions Auto-Homing Feature A towed vehicle hitch system with an automated coupler alignment mechanism wherein a motorized jack or robotic caster assembly, integrated into the towed vehicle's forward chassis, actively maneuvers the towed vehicle's coupler toward the tow vehicle's hitch ball. The system employs proximity sensors, such as LIDAR, infrared, or ultrasonic sensors, and/or cameras to detect the position of the coupling interface and adjusts the position of the towed vehicle via motorized movement of the caster assembly or jockey wheel. In one embodiment, V2V communication between the towed vehicle and tow vehicle is used to coordinate the alignment process.

Advanced Pivot Geometries

A hitch assembly featuring one or more sensor-actuated pivot joints that provide multi-axis articulation while also allowing selective locking or stiffening of specific pivot axes (e.g., yaw or roll). The system uses integrated sensors to detect conditions (such as high-speed travel, excessive lateral motion, or roadway inclination) and triggers small actuators (electromechanical, hydraulic, or pneumatic) to lock, unlock, or modulate the pivot's degree of freedom. In one embodiment, the pivot joints automatically "self-center" during highway travel to enhance stability and unlock during low-speed or off-road conditions.

On-Hitch Actuator Module

A hitch system featuring an on-hitch actuator module integrated into the hitch head or drawbar that responds to sensor input (such as from load, tilt, or angular sensors) by applying corrective forces to adjust the hitch's orientation. The actuator, which may be electromechanical or hydraulic, can actively alter the hitch's yaw stiffness or provide directional damping, thereby serving as an "active anti-sway" mechanism. In an alternative embodiment, the system includes a sensor-controlled actuator for a motorized caster wheel that steers the caster to correct misalignment without reliance on vehicle braking.

Advanced Sensor Arrays

A towed vehicle hitch system incorporating a fused sensor array that combines inertial measurement units (accelerometers, gyroscopes) with non-inertial sensors (vision systems, LIDAR, or radar) to predict and mitigate sway. The system processes sensor data using adaptive algorithms to detect early indicators of instability (such as subtle changes in pitch, yaw or lateral movement) and generates a predictive response—potentially triggering an active correction or warning the driver. In one embodiment, sensor fusion is enhanced by additional environmental sensors (e.g., wind or ambient conditions) for even more precise predictive control.

Automated Leveling & Actuators

A hitch and towed vehicle system featuring continuous, active leveling via an actuator (electromechanical, hydraulic, or pneumatic) integrated into the hitch or towed vehicle front. The actuator dynamically adjusts hitch height and/or caster position in real time based on sensor input (e.g., from load cells, tilt sensors, or accelerometers) to maintain an optimal level towing configuration regardless of road grade or shifting payloads. In one embodiment, the system employs an electronic hitch jack that fine-tunes the relative heights between the tow vehicle and towed vehicle, and actively redistributes load across the hitch.

Material Substitutions

A towed vehicle hitch assembly utilizing a hybrid structure composed primarily of advanced composite materials (such as carbon fiber reinforced polymers) in combination with strategically placed metal components (such as high-strength aluminum or stainless steel) to achieve an optimal strength-to-weight ratio. The design may include 3D-printed lattice structures in non-critical regions, providing both reduced weight and energy absorption (shock damping), while ensuring critical load-bearing areas are reinforced with conventional metals. In one embodiment, the material composition is tailored to minimize corrosion and fatigue under heavy-duty or marine environments.

Software Control Systems (IoT Connectivity)

A unified smart hitch and towed vehicle management system comprising a "Hitch Hub" device integrated into the hitch assembly that aggregates data from multiple sensors (load, sway, temperature, etc.) and communicates this information via IoT connectivity (Wi-Fi, Bluetooth, cellular) to a centralized cloud-based platform and a dedicated smartphone application. The system utilizes adaptive algorithms, potentially enhanced by machine learning, to adjust towed vehicle settings (such as brake gain, suspension stiffness, or hitch alignment) and to deliver real-time notifications regarding towed vehicle health, maintenance needs, or hazardous conditions. In one embodiment, the system supports remote firmware updates and diagnostics.

Pivot & Hitch Innovations

A hybrid mechanical-electronic hitch assembly that incorporates a traditional multi-axis coupling (e.g., a converging linkage system) with integrated electronic control features. The assembly includes sensor-actuated clutches or proportional friction brakes that can selectively lock or release one or more pivot axes (e.g., yaw or roll) based on operational conditions. In one embodiment, the hitch employs a modular damping unit that can be retrofitted onto existing hitch systems, providing electronically controllable friction and adjustable damping forces. This system allows for a selectable "stabilized" mode during high-speed travel and a "free pivot" mode for low-speed maneuvering or off-road conditions.

Integrated Chassis Design

A fully integrated towed vehicle chassis that eliminates the discrete bracket (Component #1) by welding, casting, or forming the caster assembly directly into the front frame. This approach aims to redistribute stresses across multiple flanges or welded joints, facilitating a rearward axle shift for better directional stability without relying on conventional frame geometry, for example, A-frame geometry. Reinforced chassis regions may accommodate apertures, bushings, or sleeves for the caster pivot, while coupler alignment may remain consistent with the tow vehicle via chassis-level design. By incorporating friction discs, shock absorbers, or elastomeric bushings at the caster pivot, the chassis can dampen vibration and pitching forces.

These features represent potential expansions and sensor-driven functionalities that can integrate with the load-offloading caster concept and damped multi-axis hitch.

DETAILED DESCRIPTION OF THE DRAWINGS

The drawings referenced below are exemplary only and features shown are not limited to a particular embodiment. Dimensions, materials, and configurations disclosed herein may be changed or scaled to meet specific application needs, consistent with the adaptable design intent described in this specification.

Overview of Main Components

Universal Suspension Bracket (Component #1)

Caster/Swivel Wheel Assembly (Component #2)

Motion Hitch (component #3)

In an embodiment, these three components function together to offload the majority or all of the towed vehicle's tongue weight onto a caster/swivel wheel assembly (Component #2) and provide multi-axis articulation at the motion hitch (Component #3). This beneficial combination reduces stress on the tow vehicle's suspension, mitigates sway, and improves fuel efficiency.

Figure 1B:
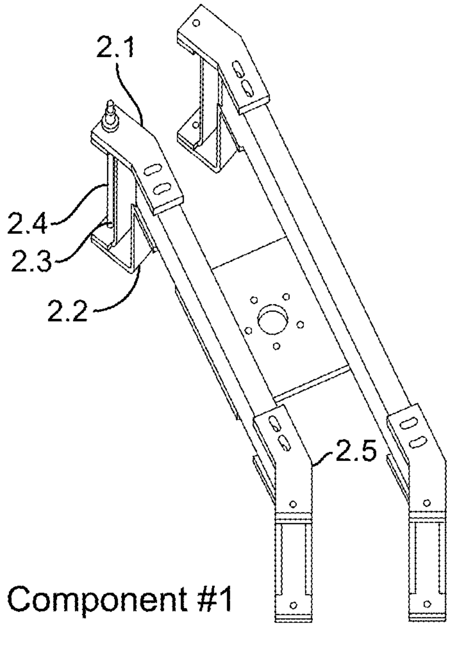
FIG. 1B is a perspective view of the Universal Suspension Bracket (Component #1).

FIG. 1A illustrates a towed vehicle frame (e.g., an A-frame, labeled 0.1) typically set at a nominal 50-degree angle, although manufacturing variances may produce angles in the 48-52 degree range. In an embodiment, the Suspension Bracket shown in FIG. 1B is designed to accommodate this existing A-frame angle variance but can be adjusted to function with new or novel forms of frame designs. A coupler (0.2) is shown at the front of the towed vehicle.

1.1 (Mounting Plate):

In an embodiment, mounting plate 1.1 is a steel plate (e.g., 12"×12") sized to fit a standard 5-lug or 6-lug towed vehicle axle hub. Plate thickness can vary (e.g., from ¼" to ½"), depending on load requirements and spindle ratings. For heavier applications, a thicker or higher-grade steel (such as A514) is recommended. This plate is welded to the adjoining square tubes or bars (1.2 and 1.3) creating the fundamental bracket structure.

1.5: Lug Nut Holes designed for bolstering attachment of 1.1 with Component #2.

1.2 and 1.3 (Bracket Tubes or Bars):

These are generally shaped to match the towed vehicle's A-frame angle. In an embodiment, tube or bar 1.2 is slightly longer than tube or bar (1.3) to accommodate typical unevenness or variations in the A-frame. In an embodiment, both of tubes or bars 1.2 and 1.3 feature oval holes (2.10, 2.11) that allow minor front/back and left/right adjustments before bolting them securely to the towed vehicle frame. These oval holes are on the top and bottom plates (2.1, 2.2, 2.5 and 2.6 [shown in FIG. 2])

Because this Suspension Bracket bears significant load, using Nyloc or heavy-duty fasteners (½" Grade 5 or Grade 8 bolts) is recommended to secure 1.2 and 1.3 to the towed vehicle A-frame. Once aligned and bolted, the bracket forms a rigid mount, creating a stable foundation for the subsequent installation of the Caster/Swivel Wheel Assembly (Component #2).

Figure 2:
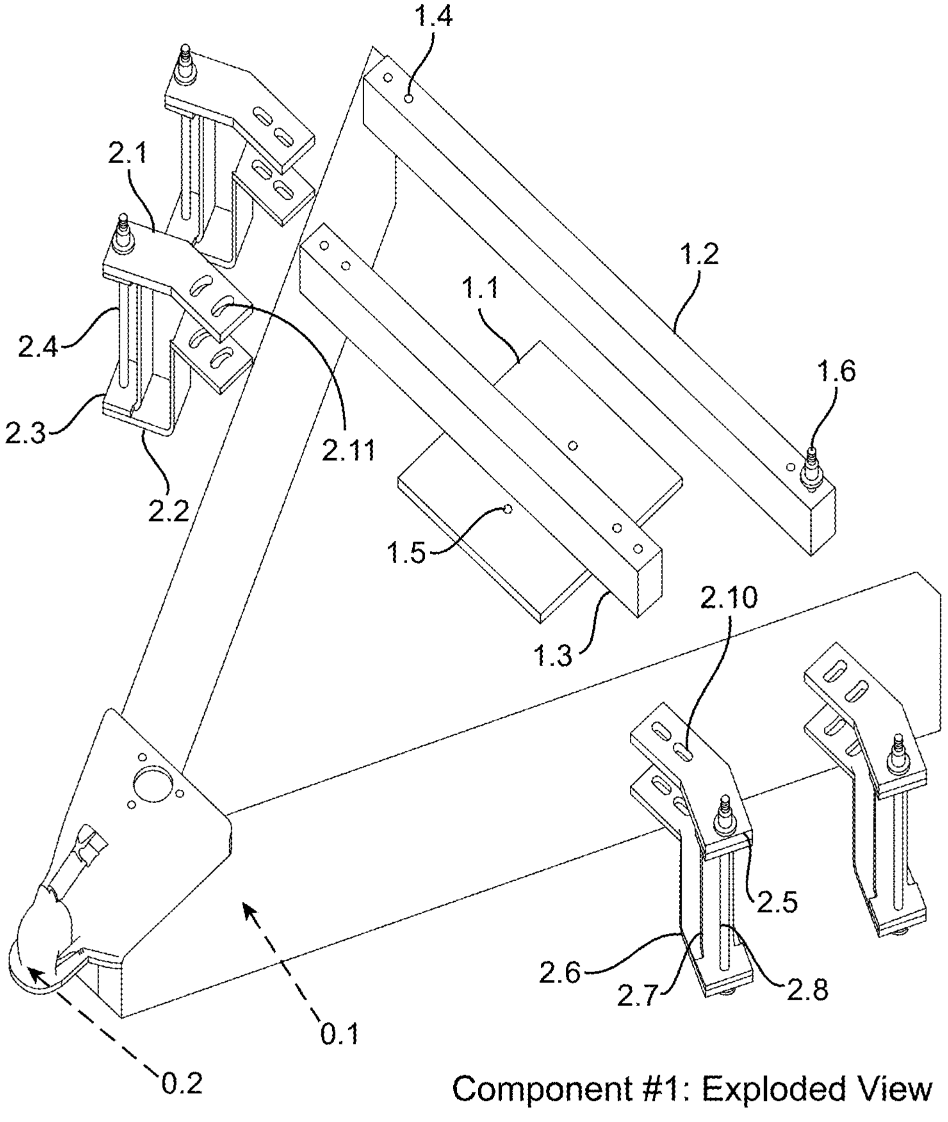
FIG. 2 provides an exploded view of the Universal Suspension Bracket (Component #1), highlighting sub-brackets (2.1, 2.2, 2.3, 2.4, 2.5, 2.6, 2.7, 2.8) and hardware (e.g., fasteners 1.6) used to secure the bracket to the towed vehicle's A-frame. This figure illustrates how the bracket hole array (1.4) and angled mounting plates (2.1, 2.5) align for fine adjustment, enabling a customized fit for varying A-frame widths and angles.
Figure 3A:
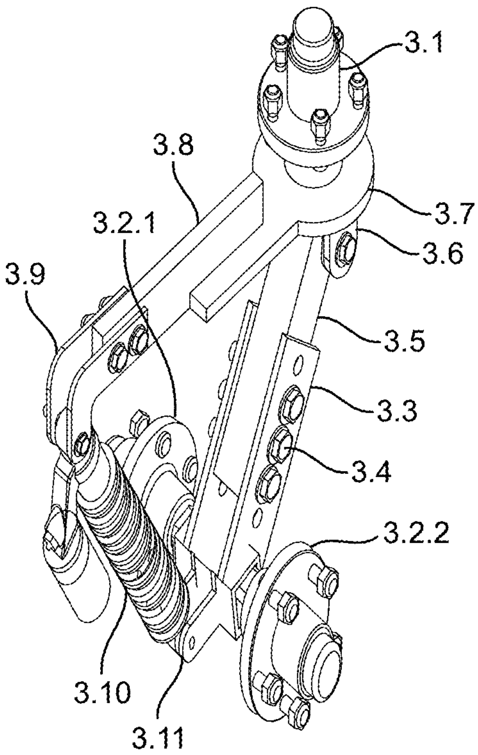
FIG. 3A-3C are perspective views of the Caster/Swivel Wheel Assembly (Component #2). Illustrated features include the idler hub (3.1), dual-wheel mounts (3.2.1/3.2.2), and shock absorption components (3.9, 3.10, 3.11). This assembly supports substantially the entire or the entire front load of the towed vehicle and may incorporate a pivot bushing (3.12) or coilover-type shock absorber to accommodate road irregularities.
Figure 3B:
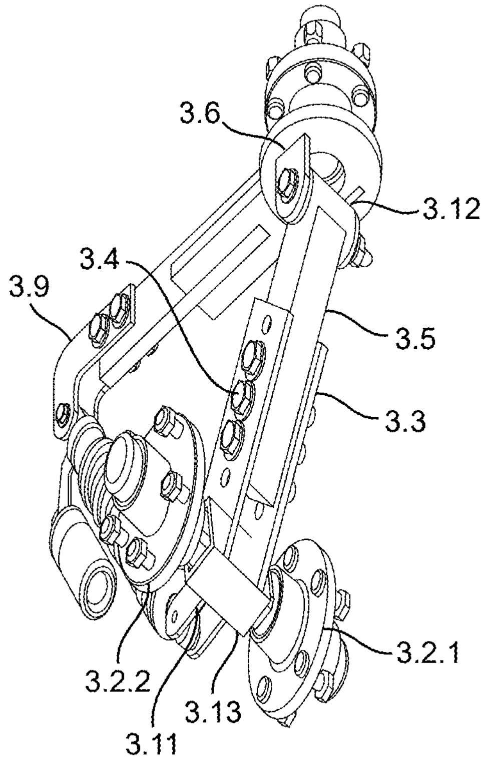
Figure 3C:
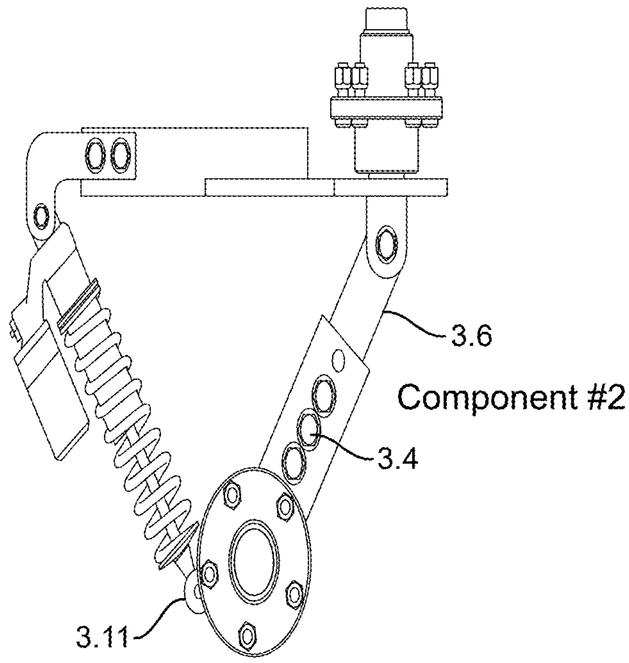

FIG. 2 depicts an exploded view of the installation between the exemplary frame and Suspension Bracket (Component #1), including sub-brackets and hardware:

Bracket Hole Array (1.4, 1.6): Demonstrates how tubes or bars 1.2 and 1.3 include a series of mounting holes. In an exemplary configuration, eight ½" holes are spaced for standard A-frame sizes, but additional or fewer holes can be introduced for different towed vehicle tongue widths or thicknesses. Bracket hole array 1.6 shows an exemplary fastener for bracket hole array 1.4.

Mounting Brackets (2.1, 2.2, 2.3, 2.4, 2.5, 2.6, 2.7, 2.8):

2.1 and 2.5: In an embodiment, thick angled plates (approximately 25 degrees) featuring oval holes (2.10, 2.11) that allow fine lateral and longitudinal adjustments.

2.2 and 2.6: In an embodiment, matching Z-Shaped angled plates supporting the underside of the A-frame; also allows fine lateral and longitudinal adjustments via oval holes 2.10/2.11

2.3 and 2.7: Connecting bracket pieces for 2.1/2.2 & 2.5/2.6, respectively.

2.4 and 2.8 Representative hardware (bolts/nuts/stabilizing connectors) that clamp the bracket sections to the towed vehicle frame.

2.12: Holes to house mounting brackets 2.4/2.8 for each of the 4 Mounting Brackets, respectively.

All subparts are designed to be scalable; dimensions may be adjusted to accommodate varying frame sizes without departing from the scope of the disclosure.

In the illustrated embodiment, four sets of these angled mounting bracket assemblies secure the towed vehicle's A-frame to tubes or bars 1.2 and 1.3 on both the left and right sides. Using Nyloc or similarly locking nuts can be preferred to ensure that vibration and road shocks do not loosen the connections over time.

Once this installation onto the exemplary frame is complete, the next step is to attach the Caster/Swivel Wheel Assembly (Component #2) beneath the Universal Suspension Bracket.

FIGS. 3A-3C and 4 show Component #2, the Caster/Swivel Wheel Assembly, which bears a substantial portion (or the entirety) of the towed vehicle's tongue weight:

Idler Hub (3.1) and Wheel Mount/s (3.2.1/3.2.2): Represents towed vehicle axle spindles and wheel-hub assemblies. In an embodiment, a 5-lug or 6-lug hub can be selected (or any other lug configuration to match lug or bolt holes 1.5 with the appropriate hub size). In an embodiment, the load rating should exceed the actual towed vehicle tongue weight by ~20% for safety margin. In this particular illustration, the spindle and idler hub 3.1 are welded together but could be attached through alternative manufacturing methods.

Figure 4:
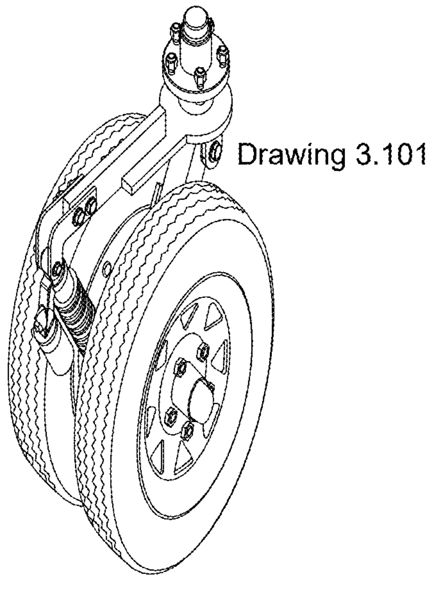
FIG. 4 is a perspective view of the Caster/Swivel Wheel Assembly (Component #2) including wheels attached to the dual-wheel mounts (3.2.1/3.2.2).

Dual-Wheel vs. Single-Wheel Configuration: While FIG. 4 shows a dual-wheel model (two spindles joined together—3.2.1 & 3.2.2) in this illustrative embodiment, a single heavy-duty caster wheel can be implemented if it meets weight requirements. A single-caster design can simplify installation and reduce parts costs, but a dual-wheel approach provides extra stability if the load rating or towed vehicle usage demands.

Support Plates (3.3): Welded between the dual spindles (where applicable) to maintain alignment. In an embodiment, these plates have a 2.01" interior gap for receiving a 2" square bar or tube (3.5).

Support Plate Fasteners (3.4): In an embodiment, hardware (e.g., bolts, rivets, or welds) used to secure the support plates (3.3) to the dual spindles and maintain precise spacing within the 2.01" interior gap. This fastening ensures consistent alignment of the square bar or tube (3.5) and prevents lateral shift or vibration under towing loads.

Square Bar (3.5)/Pivot Bushing (3.12)/Bushing Tabs (3.6): In an embodiment, square bar 3.5 seats within support plate 3.3, and pivot bushing 3.12 is welded onto square bar 3.5 to form a robust hinge point. Bushing tabs 3.6 secure pivot bushing 3.12 in place, allowing vertical motion or minor pivoting in sync with road irregularities.

Connective Stabilizer (3.7): A connecting piece with 3.8 that stabilizes the spindle and hosts idler hub 3.1.

Cross Member (3.8): A bar that connects 3.9 & 3.7. This particular illustration shows a 0.75"×2" bar of length ~11.25". However, cross member 3.8 is adjustable per respective load/size requirements of utilized shock absorber and/or wheels.

Shock Absorption (3.9, 3.10, 3.11):

3.9: In an embodiment, L-shaped mounting tabs designed to mount 3.8 and 3.10 together. Similarly to other subcomponents, the size of 3.9 must be adjusted depending on specific application requirements.

3.10: In an embodiment, a coilover-type shock absorber. The prototype has shown success with a 1000 lb spring rate, although lighter or heavier rates (e.g., 700-1500 lb) may be used depending on towed vehicle weight.

3.11: Mounting tabs to connect 3.10 and 3.3. In this depiction, two mounting tabs are welded in-between 3.2.1 and 3.2.2 and onto 3.3 at an approximate ~45-degree angle to ensure that road bumps and pitching forces are dampened effectively.

Axle Support Housing (3.13): A structural enclosure that anchors and reinforces two square towed vehicle axle spindles, ensuring correct spindle alignment, even load distribution, and prevention of unwanted deflection.

FIG. 4 shows a Completed Assembly (3.101): Once wheels are attached, the Caster/Swivel Wheel Assembly forms a system capable of bearing the towed vehicle's front load, effectively "offloading" tongue weight from the tow vehicle.

In an embodiment, the caster pivot (i.e., the axis allowing left/right "swivel") may include friction washers or a lightweight hydraulic damper to minimize wobble. This ensures stable highway travel and mitigates sudden lateral shifts.

FIGS. 5A-5B illustrate Component #3, the Motion Hitch, which connects the tow vehicle (via its receiver 0.3) to the towed vehicle's coupler (0.2) in a manner that permits multi-axis movement and buffered articulation:

Tow Vehicle Hitch Receiver (0.3): In an embodiment, standard receiver classes (I-V) are compatible.

Hitch Ball (4.1): In this illustrative embodiment, a 2 5/16-inch diameter coupling ball (Class IV) is used for towed vehicles with heavier loads. However, alternative ball sizes and classes may be substituted to accommodate specific towing requirements.

Hitch Ball Underlock (4.2): In an embodiment, the hitch ball (4.1) has a 2-inch threaded stem, which extends through a 1-inch steel plate and is secured by a heavy-duty nut. This design ensures a robust, load-bearing connection suitable for high-capacity towing applications.

Connecting Member (4.3): In an embodiment, a 6" long 2" square bar that acts as a stabilizing intermediary between 4.5, 4.6, and 4.1

Spacers (4.4): In an embodiment, 4 metal spacers installed for 4.5 and 4.6, respectively in order to reinforce overall durability Motion Arms (4.5, 4.6): In an embodiment, bars measuring ~12" in length, arranged in parallel to maintain structural rigidity and uniform movement.

In an embodiment, these motion arms may be steel bars, cast-aluminum beams, 3D-printed composite, or any equivalent structural member with sufficient tensile, shear, and fatigue strength.

Height Adjustment System (4.7, 4.8, 4.9): Once Components #1 and #2 fix the towed vehicle's frontal height, Component #3 must match that respective height. The Height Adjustment System enables the respective vertical adjustments of the hitch ball (4.1) to align more precisely with 0.2.

4.7: An adjustment plate that enables locking of variable height adjustments

4.8, 4.9: In an embodiment, adjustable extensions that allow adding/removing of bolts to lock variable height adjustments relative to 4.7. In an embodiment, the length of 4.8 is 19" long to accommodate the 14.5" long Damping Control System. 4.9 also acts as the main insertion piece of the Motion Hitch into 0.3. In an embodiment, extensions 4.8 and/or 4.9 can include bars.

Damping System Upper Tabs (4.12): In an embodiment, one or more metal tabs that secure the upper pivot bushing (4.11) to component 4.8 using bolts. These tabs maintain proper alignment of the damping system, preventing unwanted movement and ensuring consistent pivot resistance under load.

Damping Control System (4.13, 4.14, 4.15, 4.16): In an embodiment, the damping control system has a length of 14.5".

4.13: In an embodiment, a hardened metal plate or bar (4.13) that slides within 4.14. Friction pads on the inside surfaces of 4.14 contact 4.13, forming a damping interface. This illustration demonstrates a 1.5"×¼" version.

4.14: In an embodiment, a case that acts as a friction slide, enabling 4.13 to glide in-and-out. Case 4.14 can include a cavity 4.24 to slidingly receive plate or bar 4:13. In an embodiment, friction pads on the inside surfaces of 4.14 contact 4.13, forming a damping interface. For this particular depiction, there are two friction pads attached to the upper and lower sides of 4.14. In an embodiment, the space between the friction pads is slightly wider than 0.3", allowing enough space for 4.14 to slide freely when loosened.

4.15: A friction box that houses the compartmentalized interaction between 4.13, 4.14, and 4.16. In an embodiment, 4.15 is designed as a center-bent sheet metal that is secured by two bolts.

4.16: Among the features of the Motion Hitch is its user-adjustable dynamic damping subsystem, which enables the towed vehicle operator to fine-tune articulation. In the embodiment shown, the subsystem is implemented as a "Damping Control System." This Damping Control System utilizes a user-adjustable tensioning control (4.16), for example, a tensioning bolt, that in an embodiment functions as a friction dial. By tightening or loosening the tension bolt, the user can selectively vary the pressure exerted by friction pads (within components 4.13 and 4.14), thereby controlling how freely the hitch pivots vertically or longitudinally.

In an embodiment, rotating bolt 4.16 to the left (counterclockwise) reduces friction, making it easier to couple or decouple the towed vehicle and allowing more hitch movement on uneven terrain. Conversely, rotating it to the right (clockwise) increases friction, pressing the pads snugly against the sliding plate (4.13) and damping the towed vehicle's pitching. This user-adjustable damping mechanism enables precise towing under varied load conditions and driving environments, supplementing any shock absorbers or pivot bushings described elsewhere. For example, by balancing ease of coupling with stable highway travel, the Motion Hitch's Damping Control System delivers tunability that markedly improves towing safety and comfort.

This friction/damping mechanism (referred to as "user-adjustable dynamic damping subsystem" or "Damping Control System" herein) may include, but is not limited to, plate-on-plate friction surfaces, integrally molded polymeric bushings, adjustable coilover dampers, pneumatic or hydraulic dampers, magnetorheological fluid damper, fluid-filled struts, wave springs, disc springs, multi-laminate washers, or any functionally equivalent structure that restricts, enables, or manages multi-axis pivoting motion.

Pivot Linkages (4.17, 4.18, 4.19, 4.20, 4.21, 4.22): Pivot Linkages that contribute to overall enablement of vertical and longitudinal pitching, working in conjunction with the Damping Control System and Pivot Bushings (4.10, 4.11)

In an embodiment, the Pivot Linkages implement Nyloc nuts (or similarly functioning fasteners) to enable moderate tightening/loosening of parts for specific-use cases.

In an embodiment, to enable parallel alignment and uniform movement of the motion arms (4.5, 4.6), the distance between 4.19 and 4.20 is identical to the distance between 4.17 and 4.18.

Pivot Bushings (4.10, 4.11): In an embodiment, pivot bushings that hold each end of the Damping Control System in place. Designed to enable dynamic interaction between the Damping Control System and Pivot Linkages.

Over-Articulation Limiter (4.23): In an embodiment, ensures that the hitch angle does not exceed ~15° below horizontal, protecting both the hitch assembly and the caster wheel from over-articulation.

Figure 6A:
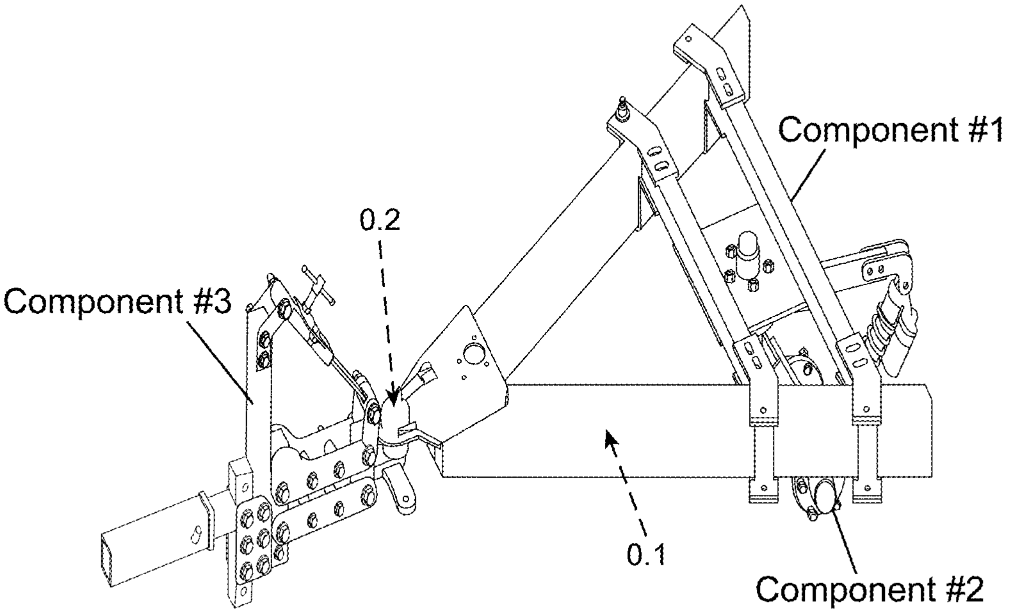
FIGS. 6A-6B are perspective views of the assembled system, integrating the Universal Suspension Bracket (Component #1), Caster/Swivel Wheel Assembly (Component #2), and Motion Hitch (Component #3) at a towed vehicle's front end. These figures also show how rearward axle placement can be facilitated once the towed vehicle's front load is borne by the caster assembly, and underscore how the three components combine to offload the front-end load, maintain multi-axis articulation, and reduce sway. For visual clarity, wheels are omitted.
Figure 6B:
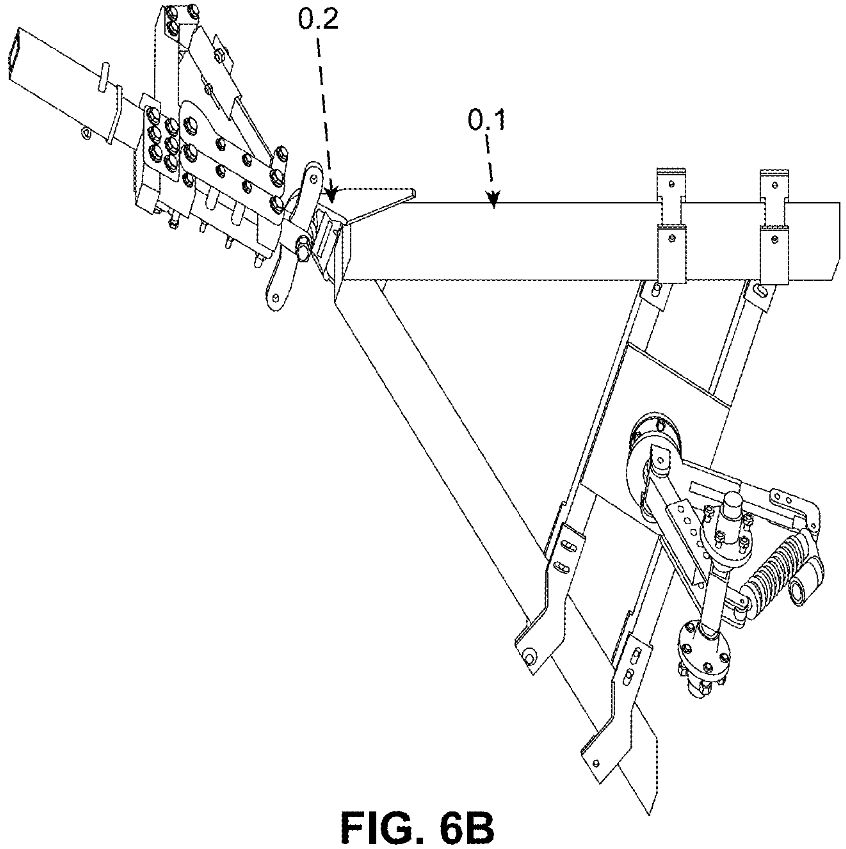

FIGS. 6A-6B display the assembled system where Component #1 (Universal Suspension Bracket), Component #2 (Caster/Swivel Wheel Assembly), and Component #3 (Motion Hitch) are all installed together. For clarity, wheels are omitted in these illustrative drawings.

Figure 7:
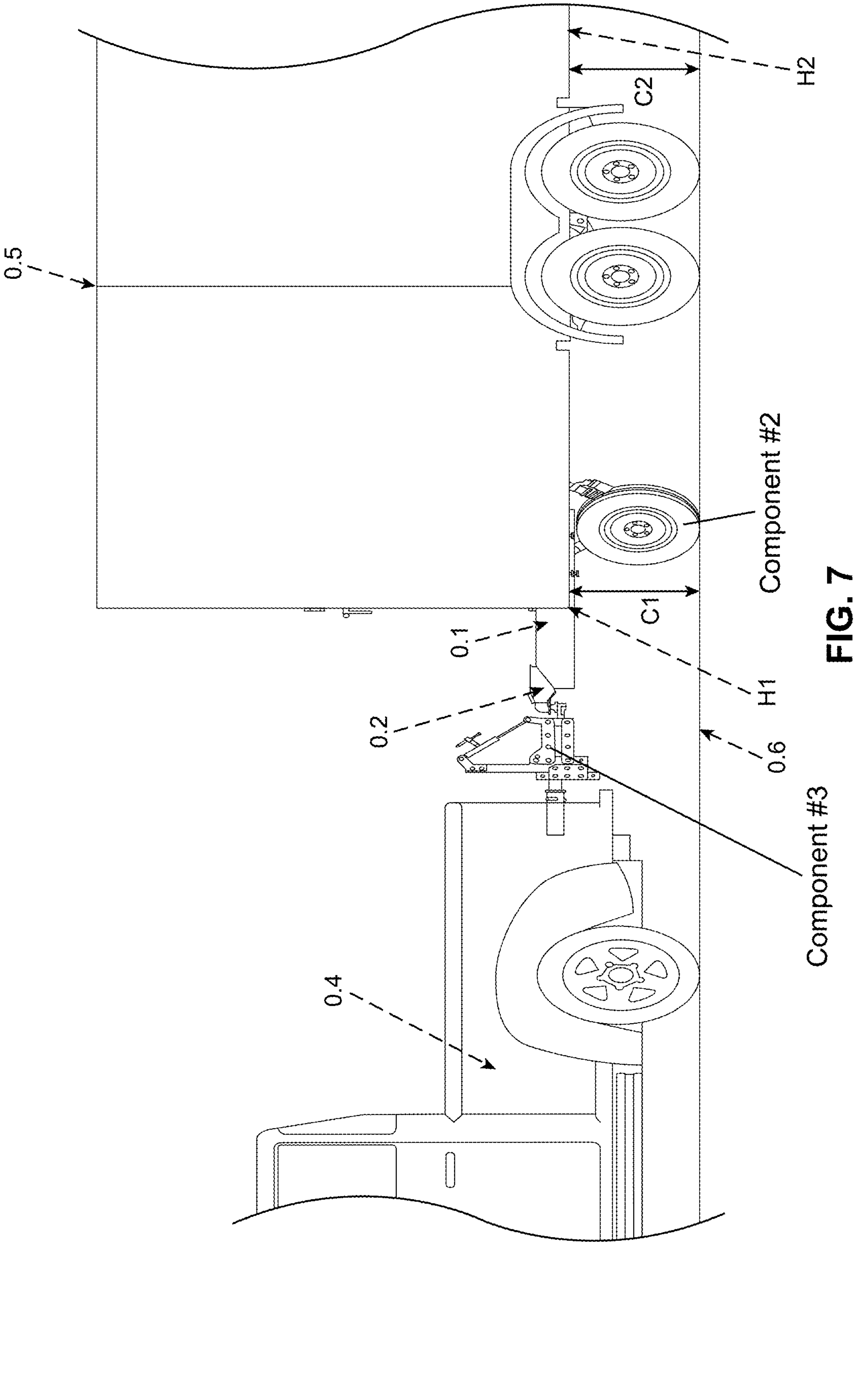
FIG. 7 is a schematic side view of the complete towing system in operation, illustrating a tow vehicle (0.4) coupled to a towed vehicle (0.5) which is equipped with the multi-axis load-offloading system, and highlighting the relative vehicle orientations used to achieve a leveled towing stance.
Figure 8A:
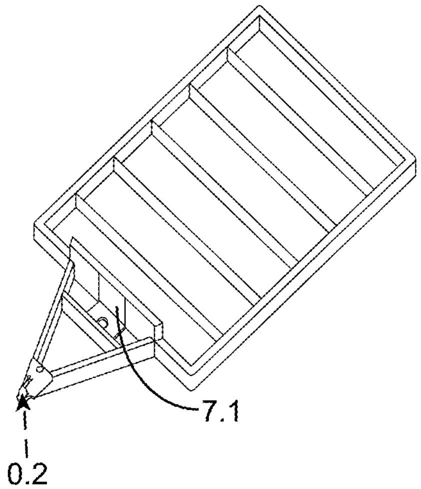
FIGS. 8A-8B are perspective views of an alternative embodiment of the load-bearing mount, illustrating a reinforced chassis mount integrated directly into the frame of the towed vehicle.
Figure 9A:
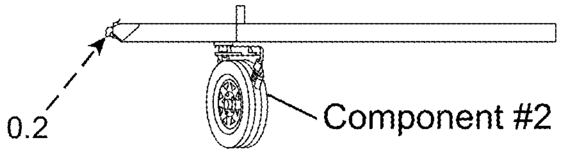
FIG. 9A is a side view and FIG. 9B is a perspective view of the embodiment of the load-bearing mount shown in FIGS. 8A-8B, with the Caster/Swivel Wheel Assembly (Component #2) attached.
Figure 8B:
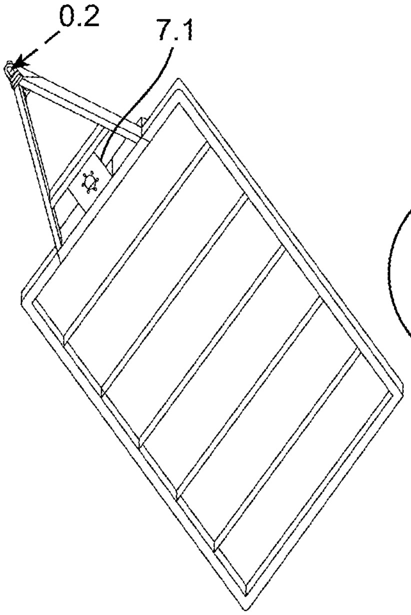
Figure 9B:
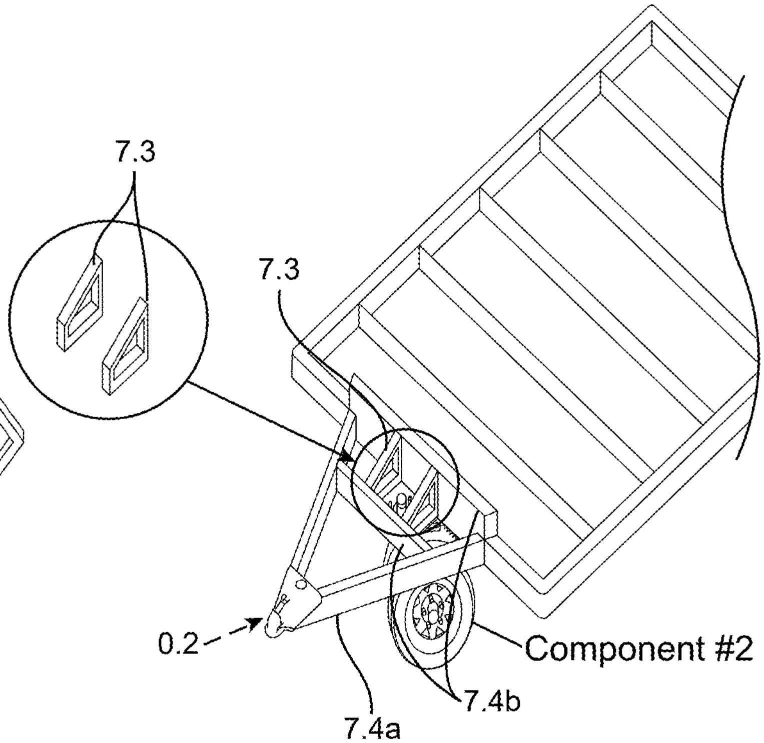

FIG. 7 is a schematic side view of the complete towing system in operation, illustrating the assembled system of Components #1, #2, and #3 coupling a tow vehicle (0.4) to a towed vehicle (0.5). The illustration underscores how the system's load-offloading function allows the towed vehicle to maintain a consistent operational height relative to its own axle, independent of the dynamic movement of the tow vehicle's suspension. As depicted, a first ground clearance (C1) is measured from the ground surface (0.6) to a forward portion of the towed vehicle's frame (H1) along a vertical direction, while a second ground clearance (C2) is measured from the ground surface (0.6) to a rearward portion of the towed vehicle's frame (H2) along a vertical direction. In an embodiment, C1 and C2 may be substantially equal during operation. For example, C2 may be within 10%, 5% or 3% of C1.

FIGS. 8A-8B and 9A-9B illustrate a load-bearing mount implemented as a reinforced chassis mount integrated directly into the towed vehicle's frame. The views show the forward chassis region (7.0) of the frame, which in an embodiment includes an integrated mounting section (7.1) configured to receive the caster assembly (Component #2). To provide the required reinforcement, in an embodiment, a pair of gussets (7.3) are shown welded or otherwise formed as an integral part of the chassis. The gusset (7.3) is positioned to structurally connect and distribute load across multiple frame members, such as the V-shaped tongue arm (7.4*a*) and the front cross-member of the main frame (7.4*b*) in an embodiment. This integrated construction, supported by the gusset (7.3), provides a robust, non-discrete mount for the caster assembly that is engineered to support substantially the entire or the entire front-end load of the towed vehicle.

The specific embodiment shown and described in relation to FIGS. 8A-8B and 9A-9B is provided for purposes of illustration to demonstrate the principles of an integrated and reinforced chassis mount. It is not intended to be exhaustive or to limit the disclosure to the precise form disclosed. One skilled in the art will appreciate that many modifications and variations are possible—for example, the shape, number, and placement of the gussets, flanges or plates, and the method of their integration—without departing from the spirit and scope of the disclosure as defined by the appended claims.

CONCLUSION OF DETAILED DESCRIPTION OF THE DRAWINGS

Taken together, FIGS. 1A-9B illustrate how three components—(1) the Universal Suspension Bracket, (2) the Caster/Swivel Wheel Assembly, and (3) the Motion Hitch—operate in tandem to offload tongue weight, provide multi-axis articulation, and reduce sway during towing. Multiple variations (e.g., integrated chassis, single-wheel vs. dual-wheel etc.) exist within the scope of the disclosure.

The present illustrations depict certain subcomponents and tabs as welded connections for clarity and demonstration. However, one skilled in the art will appreciate that these same structures may be formed by squeeze casting, high/low-pressure die castings, vacuum or semi-solid die casting, molded assemblies, or other fastening and manufacturing methods without departing from the spirit and scope of the disclosure. The references to welded joints, plates, and tabs herein are non-limiting examples intended to demonstrate robust assembly; any suitable technique to achieve equivalent structural integrity and functionality may be employed.

What is claimed is:

1. A towing system for coupling a towed vehicle to a tow vehicle, the system comprising:

- a caster wheel assembly;
- a load-bearing mount to couple to the caster wheel assembly and to a frame of the towed vehicle at a front portion of the towed vehicle; and
- a hitch to connect the tow vehicle to the towed vehicle, the hitch comprising:
  - a hitch ball,
  - a first bar,
  - a first motion arm and a second motion arm pivotably coupled to the hitch ball and pivotably coupled to the first bar to allow the hitch ball to move in a vertical direction and a longitudinal direction, and
  - a damping control system comprising a user-adjustable tensioning control, the user-adjustable tensioning control to modify a resistance force against the first motion arm and the second motion arm by modifying a normal force on a friction interface to modify a resistance to the first and second motion arms pivoting relative to the first bar.

2. The system of claim 1, the frame of the towed vehicle comprising an A-frame, and the load-bearing mount comprising a suspension bracket shaped to attach to the A-frame.

3. The system of claim 1, wherein the load-bearing mount comprises a mounting section integrated into the frame of the towed vehicle to receive the caster assembly.

4. The system of claim 1, the hitch further comprising a receiver bar to couple to a hitch receiver of the tow vehicle, wherein the first bar can be coupled to the receiver bar at varying vertical positions to adjust a height of the hitch ball relative to the hitch receiver.

5. The system of claim 1, the caster wheel assembly comprising a resilient suspension member.

6. The system of claim 5, the caster wheel assembly comprising:

- a hub to couple to the load-bearing mount;
- a wheel mount;
- a first caster arm coupled to the hub; and
- a second caster arm coupled to the hub and to the wheel mount and pivotable in a vertical direction toward the first caster arm, wherein the resilient suspension member is coupled to the first caster arm and the second caster arm and applies a resistance force against the second caster arm pivoting toward the first caster arm.

7. The system of claim 1, wherein the damping control system comprises one or more friction plates, the user-adjustable tensioning control comprising a tensioning bolt to modify a normal force on the one or more friction plates.

8. The system of claim 1, wherein the damping control system comprises friction washers.

9. The system of claim 1, wherein the damping control system comprises pivot bushings with polymeric sleeves.

10. The system of claim 1, wherein the damping control system comprises one or more coilover, strut, or oil-based shock absorbers.

11. The system of claim 1, wherein the damping control system comprises one or more wave springs or disk springs.

12. The system of claim 1, wherein the damping control system comprises a fluid-based damper.

13. The system of claim 1, wherein the damping control system comprises a magnetorheological damper.

14. The system of claim 1, wherein the damping control system comprises one or more additional articulating arms connected to the first and second motion arms and equipped with friction washers to provide adjustable pivot damping.

15. A towing system for coupling a towed vehicle to a tow vehicle, the system comprising:

- a caster wheel assembly;
- a load-bearing mount to couple to the caster wheel assembly and to a frame of the towed vehicle at a front portion of the towed vehicle;
- a hitch to connect a tow vehicle to the towed vehicle, the hitch comprising:
  - a hitch ball,
  - a first bar,
  - a first motion arm and a second motion arm pivotably coupled to the hitch ball and pivotably coupled to the first bar to allow the hitch ball to move in a vertical direction and a longitudinal direction, and
  - a damping control system comprising:
    - a user-adjustable tensioning control, the user-adjustable tensioning control to modify a resistance force against the first motion arm and the second motion arm;
    - a second bar coupled to one of the first bar or the second motion arm; and
    - a slider coupled to the other of the first bar or the second motion arm, the slider comprising a cavity to slidingly receive the second bar, wherein the user-adjustable tensioning control modifies a resistance force between the second bar and the slider.

16. The system of claim 15, wherein the user-adjustable tensioning control comprises a tensioning bolt that modifies a pressure exerted by the slider on the second bar.

17. The system of claim 16, further comprising a friction pad arranged between the second bar and a surface of the cavity of the slider.

18. A towing system for coupling a towed vehicle to a tow vehicle, the system comprising:

- a caster wheel assembly;
- a load-bearing mount to couple to the caster wheel assembly and to a frame of the towed vehicle at a front portion of the towed vehicle;
- a hitch to connect a tow vehicle to the towed vehicle, the hitch comprising:
  - a hitch ball,
  - a first bar,
  - a first motion arm and a second motion arm pivotably coupled to the hitch ball and pivotably coupled to the first bar to allow the hitch ball to move in a vertical direction and a longitudinal direction, and
  - a damping control system comprising:
    - a user-adjustable tensioning control, the user-adjustable tensioning control to modify a resistance force against the first motion arm and the second motion arm;

wherein the frame of the towed vehicle comprises an A-frame, and the load-bearing mount comprises a suspension bracket shaped to attach to the A-frame, and wherein the suspension bracket comprises elongated holes allowing longitudinal and lateral adjustments of the suspension bracket relative to the A-frame to accommodate an angle of the A-frame.

19. The system of claim 18, the suspension bracket comprising:

a first sub-bracket and a second sub-bracket to couple to opposite sides of the A-frame; and a bracket bar to extend between and couple to the first sub-bracket and the second sub-bracket, wherein at least one of the first sub-bracket, the second sub-bracket, or the bracket bar comprises the elongated holes.

* * * * *